F. W. BARTLETT.
OZONE-MACHINE.
No. 173,386. Patented Feb. 15, 1876.
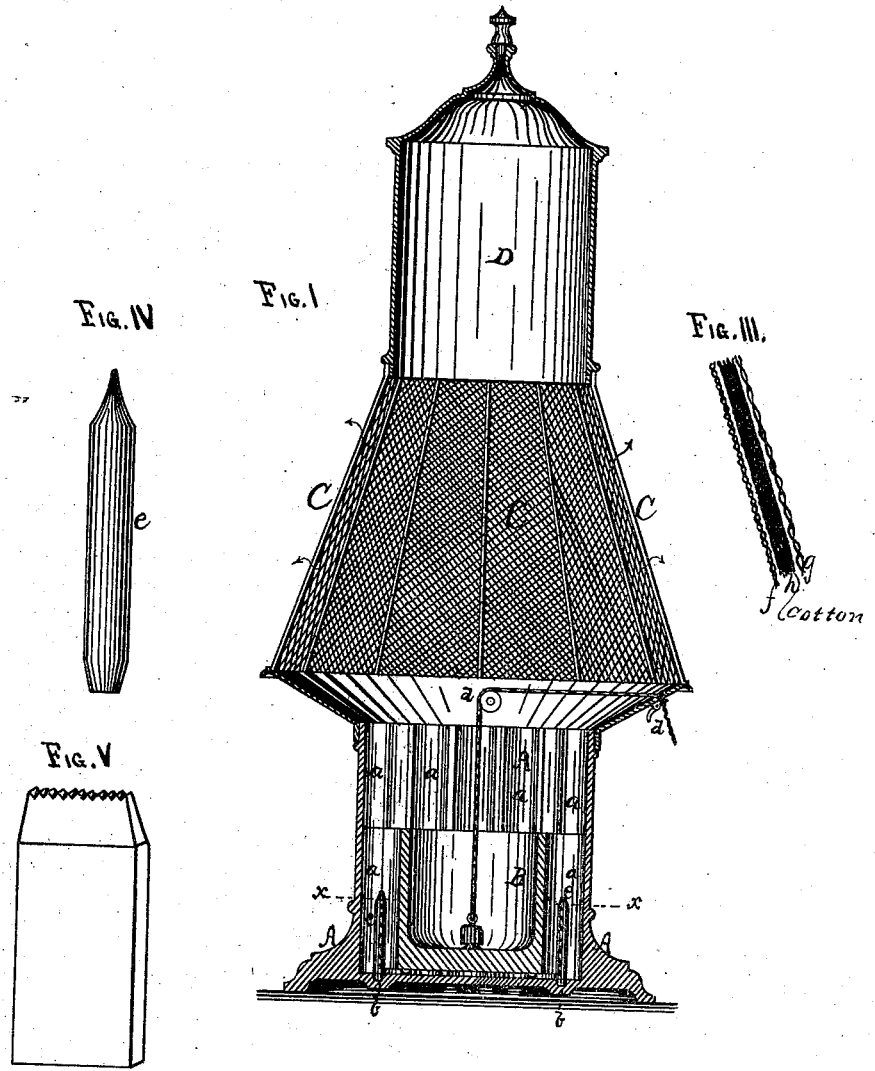

UNITED STATES PATENT OFFICE.

FREDERICK W. BARTLETT, OF BUFFALO, NEW YORK.

IMPROVEMENT IN OZONE-MACHINES.

Specification forming part of Letters Patent No. 173,386, dated February 15, 1876; application filed July 26, 1875.

*To all whom it may concern:*

Be it known that I, FREDERICK WILLIAM BARTLETT, of Buffalo, in the county of Erie and State of New York, have made certain Improvements in Ozone-Machines, of which the following is a specification:

This invention consists in the construction and arrangement of the parts by which ozone is generated in separate tubes, and then purified as it passes from the machine into the atmosphere through the chemically-prepared stuffs and wire walls, forming part of the device, as fully hereinafter described.

In the drawings, Figure 1 is a vertical central section. Fig. 2 is a plan of the separator and generating-tubes in line of $x\,x$; Fig. 3, a detail view on a large scale, showing a section of the wall of the chamber C. Fig. 4 is an edge view; and Fig. 5, a side view of the phosphorus sticks.

A is a hollow glass vessel or base, having its inner face or sides formed into a series of semicircular cavities or half-tubes, $a\,a$, and with indentations or sockets $b$ in the center of each in the bottom. B is an inner cylinder or plunger, also of glass, having corresponding semicircular cavities $c\,c$ formed on the outside, which, when the plunger is in position, (inside the outer vessel A,) will form (in conjunction with the other parts $a\,a$) a series of tubes around the interior of the vessel, as more fully shown in Fig. 2. This vessel A comprises the generating-chamber. The plunger B is made hollow with a closed bottom, and will be raised or lowered by a cord, $d$, and pulley, or any suitable means, for the purpose to be presently explained. The bottoms of the tubes $a\,c$ have the sockets $b$ to receive the phosphorus sticks $e$. These will stand up about two-thirds of the length of each whole tube $a\,c$, as shown in Fig. 1. There being a separate tube for each stick makes a complete separation of all, and renders it impossible for any sticks to communicate with or ignite each other. The space allowed in each tube above each stick of phosphorus is very important, as ozone is first generated therein in a crude state, just enough air filling the space to get a combustion from the phosphorus.

The tubes will be from one to two inches in diameter, according to the size of the machine. The size is also important, as the ozone is found to generate naturally and completely in tubes of small diameter, and having a chamber from two to four inches above the phosphorus.

In connection with these tubes my construction of the phosphorus sticks is also important. They are made flat and thin, being from one-eighth ($\frac{1}{8}$) to one-quarter ($\frac{1}{4}$) of an inch in thickness, and one inch in width, according to the size of the machine, and the upper part or combustion-point flattened or sharpened, thus giving the best oxidizing-point, and making them less likely to melt or "flash," as there is no accumulation of heat centrally in the stick. The length is graduated to the height of the generating-tubes. In this shape the combustion is better and more even, and great economy in the use of the phosphorus is obtained. The object of raising and lowering the plunger or inner cylinder B is to regulate the height of water around the phosphorus sticks, and thus graduate the combustion. As the phosphorus burns down the plunger and connected tubes are gradually raised, so as to keep about the same length of stick above the water. There will be a sufficient quantity of water used to cover the phosphorus sticks when the plunger is entirely lowered, and when raised the water will, of course, stand at a lower level, and thus expose the phosphorus sticks. By this simple arrangement any length of stick desired may be exposed for quick or slow combustion, and the machine may be left for days to run itself, the only attention required being to graduate the water by raising or lowering the plunger.

Above the glass generating-chamber or base A' is arranged an ozone-chamber, C, the walls being formed of two thicknesses of wire-cloth, the inner one $f$ being of much finer wire than the outer one $g$, and having between the two, and surrounding the entire chamber C, a cotton or linen cloth, $h$, or other porous fabric, paper, or cotton, and which is first treated with, or saturated in, an alkali or other chemicals, in such a manner as to retain it in the fibers of the stuff, so that the fumes rising from the oxidizing phosphorus will be caught therein, the acids and other impurities retained or neutralized by the chemicals having an affinity therefor, and the ozone escaping through into the room. This statement of the delivery of the ozone from these vertical walls is based upon the fact that its specific gravity is greater than that of the atmosphere, and that when passing from the chamber C by its own inclination it will naturally do so from the middle and lower part of the cylinder in preference to the upper part. All the air necessary to the combustion of the phosphorus also finds its way in through these walls, and no other arrangement for air ingress is made. This chamber C thus constructed is one of the main features of my invention.

It is determined by experiment that if the oxidation of the phosphorus is hurried or forced by too strong a draft, or otherwise, a portion of the phosphoric acids and other impurities are forced through the meshes of the stuffs $h$, and, the chemicals not having time to absorb them, they escape with the ozone and render it impure. To obviate this I provide the glass dome or expansion-chamber D, set above the ozone-chamber C, to receive the surplus products of oxidation and allow them time to become separated from the ozone. In the dome they have a cloud-like appearance, but when the ozone filters through the sides of the chamber C it cannot be detected by the eye, but its presence is very sensibly observed in the room.

The single tubes $a\ c$ separating each individual stick of phosphorus are also a very important feature of my invention, as before stated. Their arrangement around the periphery of the plunger, or on the inside of the glass case or generating-chamber A, is also important, as, by thus placing them, the action of the phosphorus and the height of the water can be seen and adjusted without removing the parts. These tubes, as well as the base or vessel A, plunger B, and dome D, will be constructed of glass, as being non-corrosive as well as transparent.

The plunger B is made hollow, so as to regulate the temperature of the water used in the vessel A, either by introducing therein ice to cool the water surrounding the phosphorus, or hot water, &c., to raise the temperature.

The prepared porous stuffs are renewed as often as necessary, and the adjacent parts are made removable for that purpose.

I claim—

1. In an ozone-machine, the combination of the hollow vessel or base A of glass, having a series of semicircular cavities, $a\ a$, on the inside and sockets $b$ in the bottom, with the plunger B, having a similar series of cavities, $c$, on the outside, and an adjusting mechanism for the purpose of adjusting the height of the water around the phosphorus and regulating its combustion, substantially as described.

2. In an ozone-generator, the walls $f$ and $g$ of wire-gauze, with an interposed layer of fibrous material saturated with alkaline solution, in combination with the vessel A and reservoir D, substantially as described.

In witness whereof I have hereunto signed my name in the presence of two subscribing witnesses.

F. W. BARTLETT.

Witnesses:
J. R. DRAKE,
T. H. PARSONS.